US006412109B1

United States Patent
Ghosh

(10) Patent No.: US 6,412,109 B1
(45) Date of Patent: Jun. 25, 2002

(54) METHOD FOR OPTIMIZING JAVA BYTECODES IN THE PRESENCE OF TRY-CATCH BLOCKS

(75) Inventor: Sanjoy Ghosh, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/241,365

(22) Filed: Jan. 29, 1999

(51) Int. Cl.$^7$ .................................................. G06F 9/45
(52) U.S. Cl. ........................ 717/155; 717/152; 717/156; 717/124; 714/38; 714/48
(58) Field of Search ........................ 717/5, 7, 4, 9, 717/151, 124, 136, 146, 106, 48, 118; 707/103, 103 R–103 Z; 714/38, 15, 35

(56) References Cited

U.S. PATENT DOCUMENTS

| | | | | |
|---|---|---|---|---|
| 5,628,016 A | * | 5/1997 | Kubol | 717/140 |
| 5,740,441 A | | 4/1998 | Yellin et al. | 717/134 |
| 5,748,964 A | | 5/1998 | Gosling | 717/126 |
| 5,778,233 A | * | 7/1998 | Besaw et al. | 717/154 |
| 5,787,431 A | | 7/1998 | Shaughessy | 707/100 |
| 5,948,113 A | * | 9/1999 | Johnson et al. | 714/38 |
| 6,003,038 A | * | 12/1999 | Chen | 707/103 R |
| 6,081,665 A | * | 6/2000 | Nilsen et al. | 717/116 |
| 6,131,187 A | * | 10/2000 | Chow et al. | 717/106 |
| 6,233,733 B1 | * | 5/2001 | Ghosh | 717/118 |

OTHER PUBLICATIONS

Helaihel–Olukotun, Java as a Specification Language for Hardware–Software Systems, Sep. 1997, IEEE.*
Bernadat, et al., "Java Sandboxes meet Services Guarantees: Secure Partitioning of CPU and Memory", Dec. 14, 1998, The Open Research Institute, Cambridge, MA, pp. 1–24.
O'Connor, J.M., et al., "PicoJava–I: The Java Virtual Machine in Hardware", Citation and Abstract Search Results View Full Page, IEEE/IEE Electronic Library, Mar./Apr. 1997, pp. 45–53.

* cited by examiner

Primary Examiner—Tuan Q. Dam
Assistant Examiner—Hoang-Vu Anthony Nguyen-Ba
(74) Attorney, Agent, or Firm—Thelen Reid & Priest LLP; David B. Ritchie

(57) ABSTRACT

A method for optimizing bytecode in the presence of try-catch blocks comprises generating an Intermediate Representation of the bytecode, scanning each basic block of the bytecode to identify try blocks, scanning each basic block of the bytecode to identify try-blocks, splitting each try-block into a first half and a second half at the first statement that can throw an exception, establishing an edge between the first half and the second half of each try-block, between the first half and the catch block, and between the catch block and the basic block subsequent to the second half of each try-block.

4 Claims, 4 Drawing Sheets

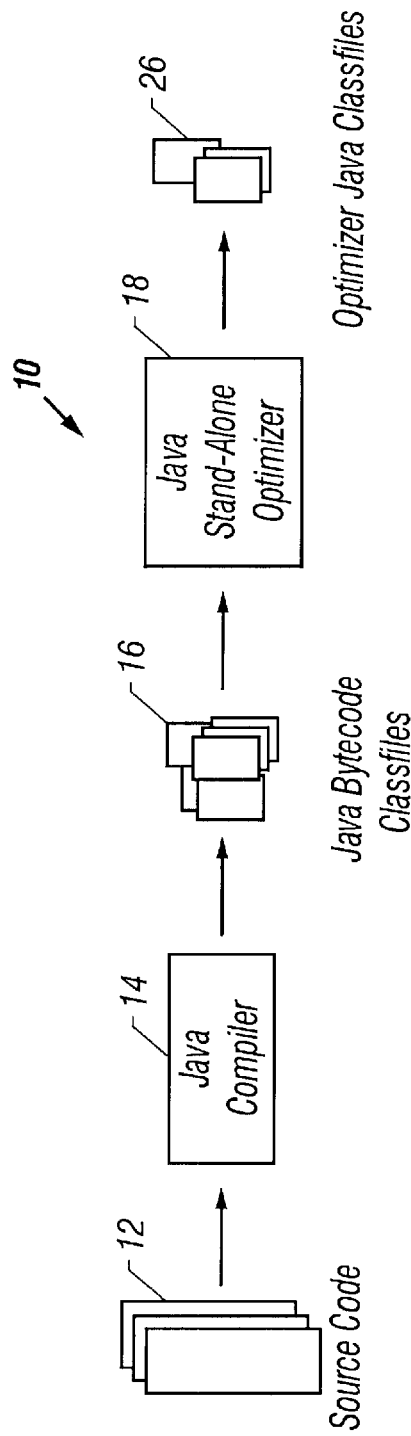
FIG. 1A *(Prior Art)*
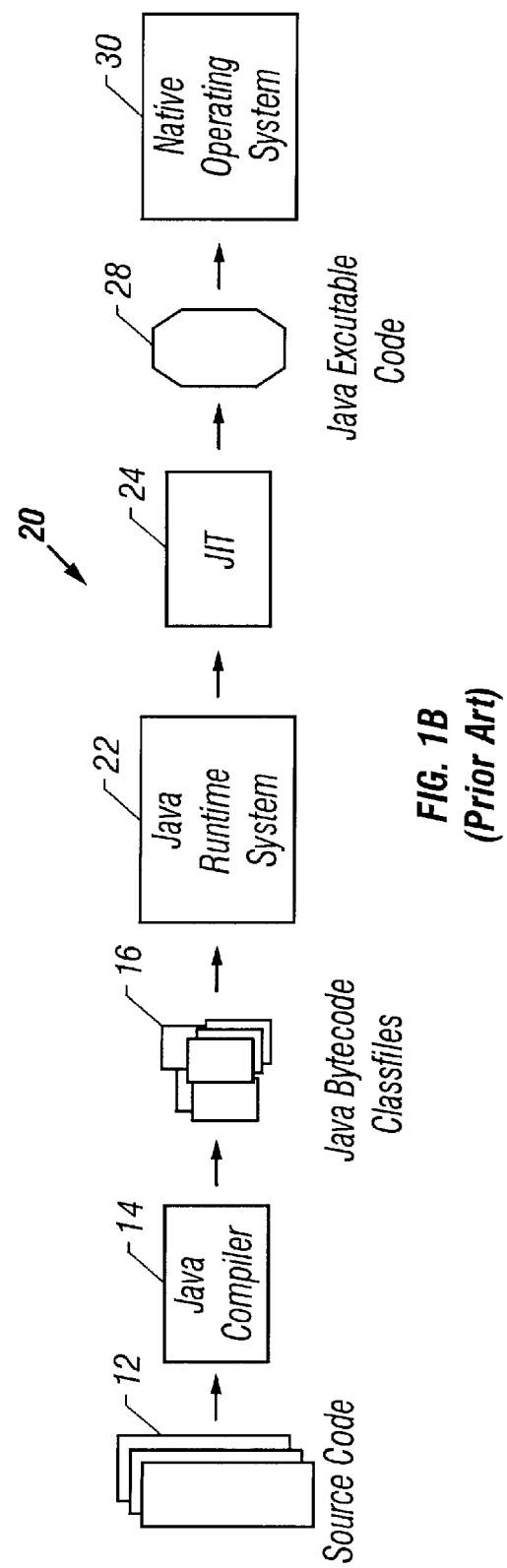
FIG. 1B *(Prior Art)*

METHOD FOR OPTIMIZING JAVA BYTECODES IN THE PRESENCE OF TRY-CATCH BLOCKS

BACKGROUND OF THE INVENTION

1. Field of the Invention

The present invention relates to the optimization of Java class files. More particularly, the present invention relates to method for optimizing Java bytecode in the presence of try-catch blocks

2. The Prior Art

A known problem for software developers and computer users is the lack of portability of software across operating system platforms. Attempts to address this problem must include means of ensuring security as computers are linked together in ever expanding networks, such as the World Wide Web. As a response to both of these concerns, the JAVA programming language was developed at Sun Microsystems as a platform independent, object oriented computer language designed to include several layers of security protection.

Java achieves its operating system independence by being both a compiled and interpreted language. First. Java source code, which consists of Java classfiles, is compiled into a generic intermediate format called Java bytecode. Java's bytecodes consist of a sequence of single byte opcodes, each of which identifies a particular operation to be carried out. Additionally. some of the opcodes have parameters. For example, opcode number 21, iload<varnum>, takes the single-word integer value stored in the local variable, varnum, and pushes it onto a stack.

Next, the bytecodes are interpreted by a Java Virtual Machine (JVM) which translates the bytecodes into native machine code. The JVM is a stacked-based implementation of a "virtual" processor that shares many characteristics with physical microprocessors. The bytecodes executed by the JVM are essentially a machine instruction set, and as will be appreciated by those of ordinary skill in the art, are similar to the assembly language of a computing machine. Accordingly, every hardware platform or operating system may have a unique implementation of the JVM, called a Java Runtime System, to route the universal bytecode calls to the underlying native system.

When developing the JAVA bytecode instruction set, the designers sought to ensure that it was simple enough for hardware optimization and also included verification means to provide security protection and to prevent the execution errors or system crashes that can result from improperly formatted bytecode. As Java's bytecodes contain significant type information, the verification means are able to do extensive type checking when the bytecodes are first retrieved from the internet or a local disk. As a result, the interpreter of the native machine need only perform minimal type checking at run time. Unlike languages such as SmallTalk that provide protection by performing extensive runtime checks, Java executes more quickly at run time.

Although Java provides security through verification means and portability through bytecodes, Java programs lag natively compiled programs, written in languages like C/C++, in their execution time. When a user activates a Java program on a Web Page, the user must wait not only for the program to download but also to be interpreted. To improve Java's execution time, optimizations can be introduced into the processing of Java bytecodes. These optimizations can be implemented in a variety of manners including as Stand-Alone Optimizers (SAO) or as part of Just-in-Time (JIT) compilers.

A SAO transforms an input classfile containing bytecode into an output classfile containing bytecodes that more efficiently perform the same operations. A JIT transforms an input classfile containing bytecode into an executable program. Prior to the development of JITs, a JVM would step through all the bytecode instructions in a program and mechanically perform the native code calls. With a JIT compiler, however. the JVM first makes a call to the JIT which compiles the instructions into native code that is then run directly on the native operating system. The JIT compiler permits natively compiled code to run faster and makes it so that the code only needs to be compiled once. Further, JIT compilers offer a stage at which the executable code can be optimized.

To either optimize or compile bytecodes involves the translation of the source bytecodes into what is known in the art as an intermediate representation (IR). The IR provides information about two essential components of the program: the control flow graph (CFG) and the data flow graph (DFG). Subsequently, the IR is transformed for compilers into object code and for optimizers into an improved version of the source code format.

The CFG breaks the code into blocks of bytecode, termed basic blocks, that are always performed as an uninterrupted group of instructions, and establishes the connections that link the basic blocks together. In so doing, the CFG represents different variations of the sequence in which the instructions of a program can be performed. The connections between basic blocks are known in the art as edges. The DFG maps the connections between where data values are produced and where they are used.

Instructions that can drastically alter the control flow of a program are known as exceptions. There are generally two known approaches for dealing with the problem: either a separate block of code is written that explicitly address the exception condition or one is not.

When a separate code is written. what is known in the art as a try-catch block is created. The try block includes code that identifies the presence of an exception condition. When such a condition is present. the try block passes control of the execution of the program to a catch block. This operation is known in the art as throwing an exception. The catch block is a section of code that has been written to specifically address or resolve the exception condition. One skilled in the art will be familiar that catch blocks are also known as exception handlers.

When no separate blocks of code are written, execution of the program returns to the method that called the method with the exception. The calling method may provide for the exception, i.e. address the situation in which a call to the particular method fails, or again pass control to its calling method. If no calling method addresses the exception, then execution will return out of all methods and the program will terminate. For example as is known in the art, this is the approach commonly taken with "out-of-memory" exceptions.

Exceptions that do not have catch-blocks generally do not present optimization challenges. Optimization depends on an analysis of the execution of a program as embodied in the CFG to determine a more efficient means of performing the same operations. As is known in the art, this often includes eliminating repetition between earlier and later sections of code. Exceptions without catch blocks, however, do not add to the CFG of a program. Although they prompt execution to return to the calling method(s), they do not represent a different forward sequence through which the program can iterate. By not providing additional subsequent code, exceptions without catch blocks do not afford any standard optimization opportunities.

Try-catch blocks, however, do add subsequent code that can alter the execution of a program, but due to the complex, unpredictable, and difficult to account for changes in control flow that can accompany them, try-catch block exceptions traditionally have not been addressed by standard optimization frameworks. That is, the prior art approach has been to skip and not optimize sections of code containing try-catch blocks. Accordingly, it is an object of the present invention to provide a method for integrating try-catch blocks into CFGs so that optimizations can be done even in the presence of try-catch exceptions.

These and many other objects and advantages of the present invention will become apparent to those of ordinary skill in the art from a consideration of the drawings and ensuing description of the invention.

SUMMARY OF THE INVENTION

The present invention is directed to the optimization of Java classfiles by allowing for optimizations to take place in the presence of try-catch blocks.

According to the present invention, an IR is generated from an input bytecode file. Next, each basic block in the IR is scanned to identify the presence of try blocks. Each try block is subsequently split into two halves. Edges are then established between the two halves, between the first half and the catch block, and finally between the catch block and the second half. For all backwards dataflow problems, the basic try blocks are split at the last instruction that can throw an exception.

BRIEF DESCRIPTION OF THE DRAWINGS

FIG. 1A is a flow diagram of the optimization of a JAVA bytecode source file using a stand alone optimizer according to a prior art.

FIG. 1B is a flow diagram of the optimization of JAVA bytecode source file using a just in time compiler according to a prior art.

DESCRIPTION OF THE PREFERRED EMBODIMENTS

Figure 2:
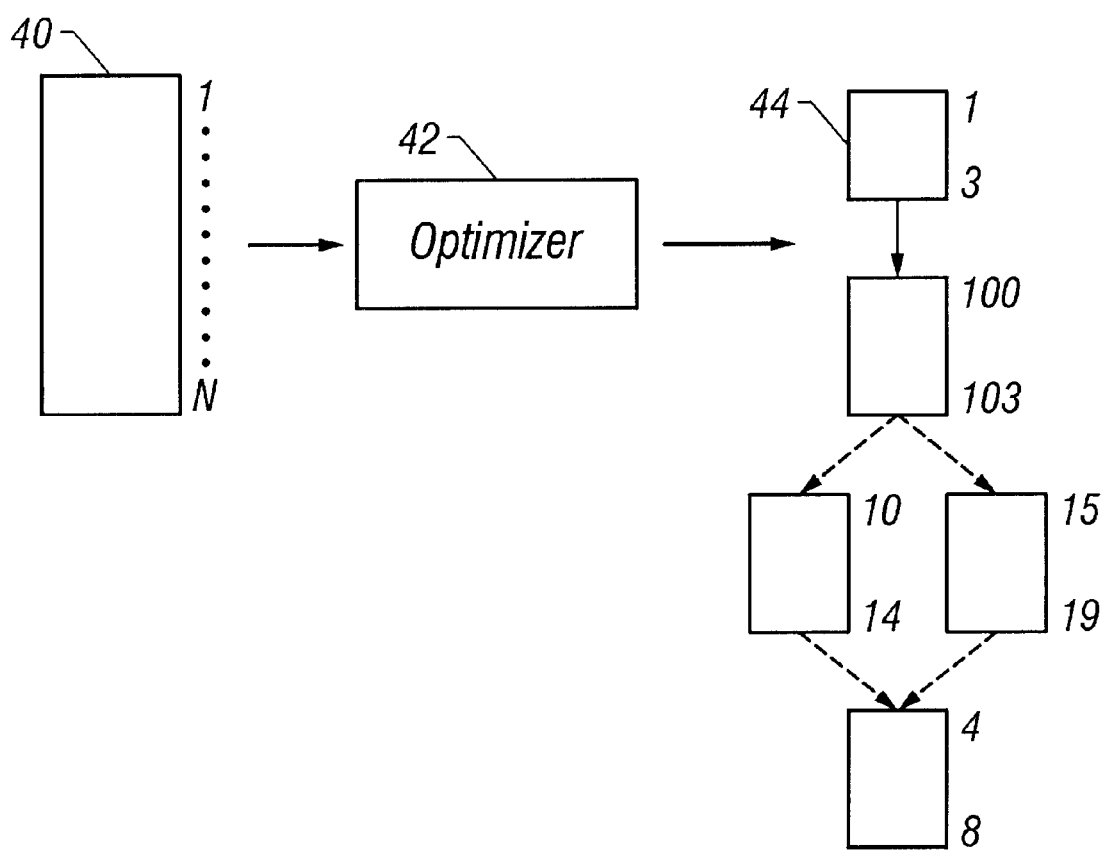
FIG. 2 is a flow diagram illustrating the generation of control flow graph from a bytecode source file suitable for use according to a prior art.

Those of ordinary skill in the art will realize that the following description of the present invention is illustrative only and is not intended to be in any way limiting. Other embodiments of the invention will readily suggest themselves to such skilled persons from an examination of the within disclosure.

Referring first to FIGS. 1A and 1B, simplified flow diagrams 10 and 20 of the optimization of a Java bytecode source file are illustrated. In both flow diagrams 10 and 20, Java source code file 12 is compiled by a Java compiler 14 into Java bytecode classfiles 16. In flow diagram 10, the classfiles are operated on by a SAO 18, and in flow diagram 20, the classfiles are passed through a Java Runtime System 22 to a JIT compiler 24. The Java SAO 18 outputs Java classfiles 26 containing bytecodes that perform the same operations as the input classfiles, only in an optimized manner. The JIT 24 outputs executable code 28 that can run directly on the native operating system 30. Those of ordinary skill in the art will recognize that the procedures described in FIG. 1 are merely illustrative and that there exist other structures within which classfiles may be optimized.

In processing an input bytecode source classfile, both an SAO and a JIT form an IR. As described above, an IR is a succinct and straightforward structuring of the control and data flow information of a program into a CFG and DFG. The CFG represents the information regarding the sequence and order of the execution of the bytecode instructions as blocks of code linked in the order of execution of the program. The basic blocks of code are sections of bytecode that are always performed as an uninterrupted group, and the links between the blocks of code are bytecode branch, conditional, or jump instructions.

FIG. 2 is a flow diagram that illustrates the generation of the CFG from a bytecode classfile 40. It should be appreciated that there are several known methods for generating a CFG. The specifics of any such method will not be disclosed herein to avoid overcomplicating the disclosure and thereby obscuring the present invention. The procedure begins with a classfile 40 containing an ordered sequence of bytecode instructions numbered from 1 through N. The numbers 1 through N are analogous to the numbering of lines in a computer program as is known in the art. Next, an optimizer 42 processes the bytecode classfile 40 to extract the control flow information from the bytecodes.

The control flow information is illustrated by the CFG 44. For example, the CFG 44 may indicate that for classfile 40 that bytecode instructions 1 through 3 are first executed, instructions 100 through 103 are next executed, either instructions 10 through 14 or 15 through 19 are next executed, and finally instructions 4 through 8 are executed before the remainder of the bytecode instructions execute. It will be appreciated that the CFG 44 is an example only, and that any number of CFGs may be generated from the classfile 40 by the optimizer 42.

As described above, exceptions are lines of bytecode that can drastically alter the control flow of a program. As is know in the art, they are usually an attempt to detect improper input or errors on the part of the user or the program. As only try-catch blocks are relevant to the present invention, all exceptions will be assumed to be part of try-catch blocks so that the disclosure will not be overcomplicated thereby obscuring the present invention. The following sections of pseudocode are illustrations of Java code that would throw an exception.

int y=5/0;

The assignment of a value to "y" will throw an exception because it involves the undefined division of an integer by zero.

int[ ]x=new int[10];
    int i=x[10];

The assignment of a value to "i" corresponding to the 11th location in the array "x", will throw an exception because it is an out-of-bounds call on the array "x".

string str=NULL;
      str.length( );

The method call "length" causes an exception because it is an attempt to use the pointer "str" whose value has been assigned the value "NULL".

Figure 3A:
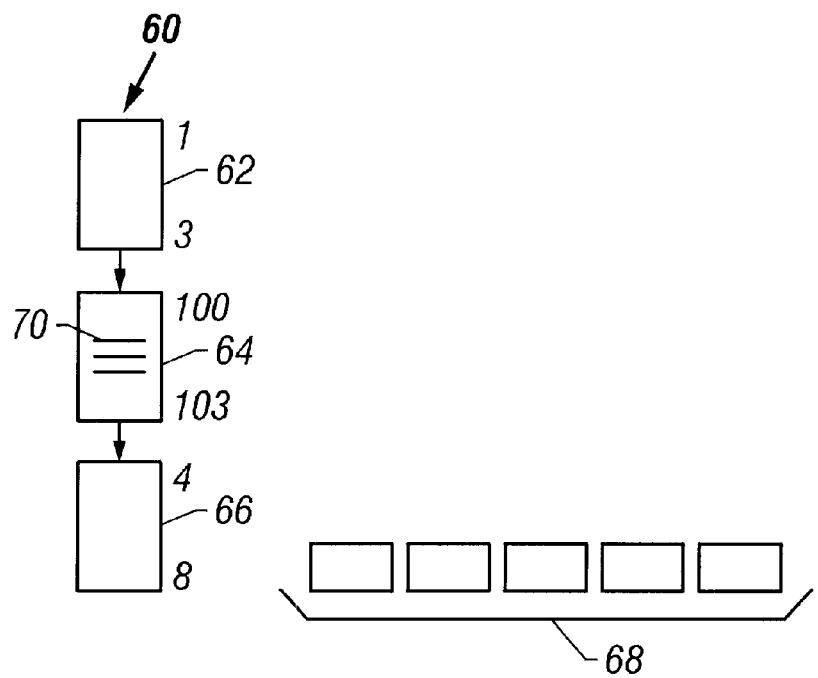
FIG. 3A is a flow diagram of a control flow graph with an exception suitable for use according to a prior art.

FIG. 3A is a flow diagram that demonstrates the disruption in the control flow of a program introduced by an exception. FIG. 3A contains a CFG 60, represented by basic blocks 62, 64, 66, and a series of exception handlers 68. Try block 64 contains a plurality of lines of code designed to detect exceptions. The exception handlers are the set of catch blocks that are associated with all the exceptions that can be thrown by the try block 64. In normal operation, blocks 62, 64, and then 66 will execute in order. If the exception condition corresponding to the detection line 70 is present, the running of block 64 will be aborted and the type of the exception will be determined. Execution will then jump to the catch blocks 68 which will be scanned to determine if a section of code has been written to address the particular situation. Once the catch block has been identified, its code will be run.

Due to the unusual or unexpected nature of the changes in the control flow introduced by try-catch blocks, the prior art approach was to skip optimization of code containing try-catch blocks. The present invention, however, allows for the optimization of bytecode in the presence of try-catch blocks by including details of their operation in the CFG.

Figure 3B:
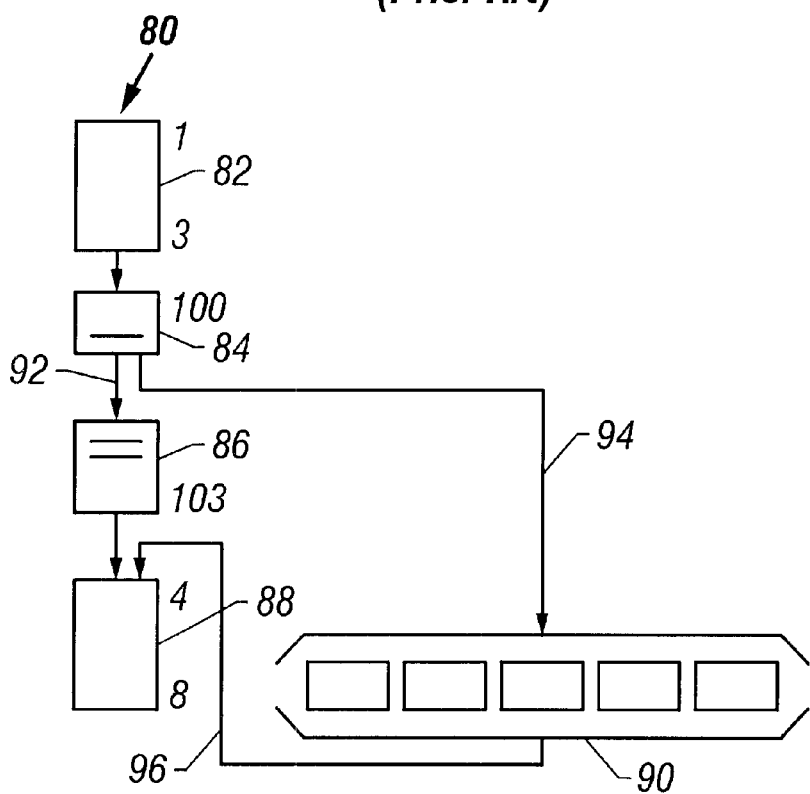
FIG. 3B is a flow diagram of a control flow graph including try-catch block exceptions according to a specific embodiment of the present invention.

In FIG. 3B, a flow diagram of a CFG 80 expanded to include the control flow information of a try-catch block is presented. The underlying bytecodes are the same as in FIG. 3A. The expanded CFG includes basic blocks 82, 84, 86, 88 and the catch blocks 90.

Figure 4:
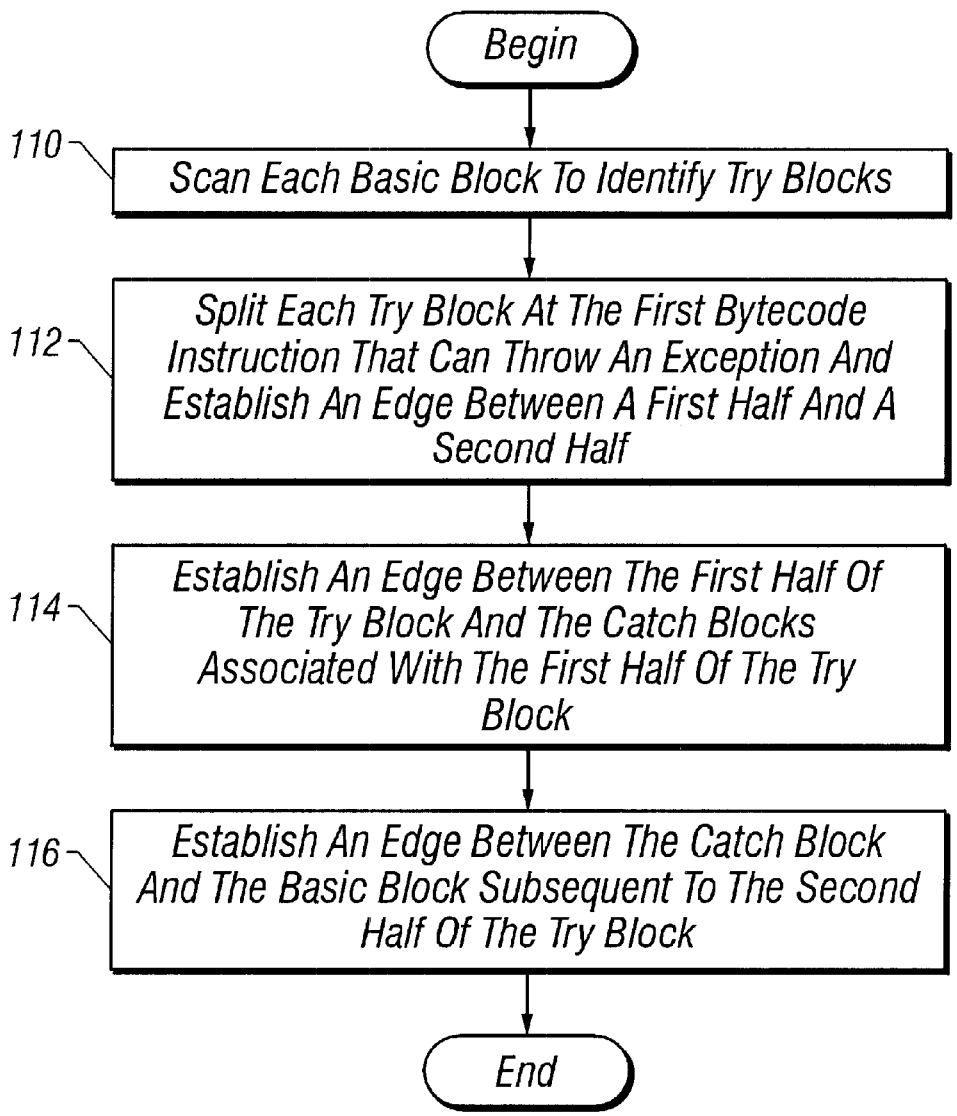
FIG. 4 is a block diagram for the inclusion of try-catch blocks in the CFG portion of the IR according to a specific embodiment to the present invention.

Referring now to FIG. 4, a block diagram outlining a method for including the details of a try-catch block in the CFG according to a specific embodiment of the present invention is illustrated.

At step 110 in FIG. 4, each basic block is scanned for try blocks. Applied to CFG 60 in FIG. 3A, block 62 and then block 64 are scanned. Block 64 is identified as a try block due to the presence of the exception 70.

Next at step 112 in FIG. 4, each try block is split into a first half and a second half at the first bytecode that can throw an exception and an edge is established between the first half and the second half. A comparison of the CFGs 60 and 80 in FIGS. 3A and 3B demonstrates the separation of block 64 into blocks 84 and 86. The edge 92 is the newly established link between blocks 84 and 86.

Next at step 114 in FIG. 4, an edge to the exception handler associated with the first bytecode throwing the exception is established. FIG. 3B shows this as a link 94 from block 84 to catch blocks 90. All catch blocks 90 within the exception handler are associated with all exceptions present in the split try-blocks 84 and 86.

Finally at step 116 in FIG. 4. an edge is established between the catch blocks and the basic block subsequent to the try block. In FIG. 3B this is the connection 96 between the catch blocks 90 and the basic block 88. It should be noted that when the exception condition is not present, CFG 80 represents program execution identical to CFG 60. The execution of bytecode blocks 62, 64, 66 is the same as that of bytecode blocks 82, 84, 86, 88. It should be appreciated that the present invention is based on the most conservative assumption for all forward dataflow problems. By splitting at the first exception the present invention requires the minimal amount of information to be added to the IR while still allowing for optimization. The present invention assumes that if the execution of the try block is going to throw an exception, then it will do so at the first branch opportunity.

Every try-catch blocks is therefore split at the first bytecode instructions that can throw an exception. Every catch block for this try-block is assumed to be one of the successors of this first bytecode instruction. The immediate successor of the try block will have all of the catch blocks as its predecessors.

It should be noted that the different kinds of exceptions that are caught by multiple catch clauses for the same try-block are not distinguished. That is, the present invention is concerned about whether an exception can be thrown or not—and not its kind. This is because this approach seeks to be compatible in a JIT compiler and therefore no time is spent analyzing the kind of exception that can be thrown.

Figure 5:
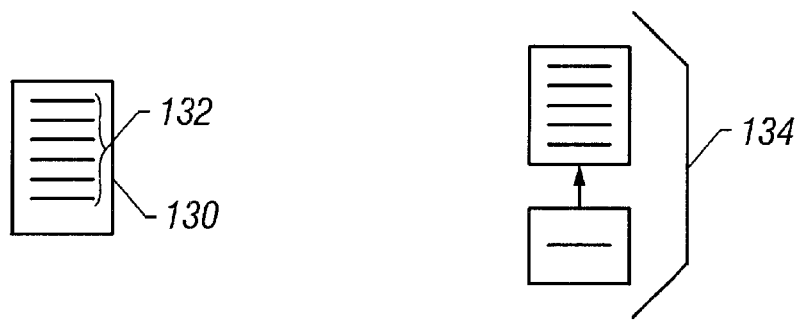
FIG. 5 is a flow diagram for the splitting of a try block scanned in a backwards manner according to a specific embodiment of the present invention.

The present invention also addresses dataflow scans that proceed in a backwards manner. For backwards dataflow scans, a basic try block is split at the last instruction in the block that can throw an exception. This corresponds to the first exception encountered when a backwards scan is performed. Referring now to FIG. 5, a basic try block 130 that is to be scanned backwards is shown. The try block contains a plurality of instructions that can throw exceptions 132. The blocks 134 represents the same try block after a split according to the present invention has been performed at the last instruction that can thrown an exception.

The following pseudocode illustrates the optimization possibilities of the present invention.

```
{
    int i = 2;
    .
    .
    .
    if( some exception condition){
        method call to catch block
    }
}
```

The pseudocode contains an assignment "int i=2" followed by an instruction that can throw an exception. As will be known to one skilled in the art, when possible a local variable declared in a method will have its value stored in a register to increase the speed of operation of the program.

In the presence of an exception, however, the value will normally be stored in memory because prior to the present invention the details of the catch blocks were not represented in the IR. These details include information about the values used by the catch block. As the value of "i" might be required by the catch blocks and as this information would not be visible outside the method if stored in a register, the value was stored in memory. The present invention, however, allows for the details of the catch block to be included in the IR. If it were determined that the value "i" were not used by the catch blocks, then the variable's value could be stored in a register. The present invention would, therefore, allow for the optimization of the method even though it was associated with a try-catch block. As exceptions are common through out bytecode source code, the present invention creates a considerable increase in the amount of bytecode that can be optimized.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for optimizing bytecode in the presence of try-catch blocks comprising:

generating an Intermediate Representation of the bytecode, said Intermediate Representation comprising at least one basic block;

scanning each basic block to identify a try block;

splitting said try block into a first half and a second half, at the first statement in said try block that can throw an exception;

establishing an edge between said first half and said second half of said try-block;

establishing an edge between said first half and a catch block associated with said try-block; and establishing an edge between said catch block and a basic block subsequent to said second half of said try-block.

2. The method according to claim 1, wherein said scanning proceeds in a backward dataflow manner.

3. The method according to claim 1, wherein said scanning proceeds in a forward dataflow manner.

4. A program storage device readable by a machine, tangibly embodying a program of instructions readable by the machine to perform a method for optimizing bytecode in the presence of try-catch blocks, the method comprising:

generating an Intermediate Representation of the bytecode, said Intermediate Representation comprising at least one basic block;

scanning each basic block to identify a try block;

splitting said try block into a first half and a second half, at the first statement in said try block that can throw an exception;

establishing an edge between said first half and said second half to said try-block:

establishing an edge between said first half and a catch block associated with said try-block; and establishing an edge between said catch block and a basic block subsequent to said second half of said try-block.

* * * * *